United States Patent
Kaba

(10) Patent No.: US 8,985,170 B2
(45) Date of Patent: Mar. 24, 2015

(54) PNEUMATIC TIRE

(71) Applicant: The Yokohama Rubber Co., Ltd., Minato-ku, Tokyo (JP)

(72) Inventor: Naoto Kaba, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/857,062

(22) Filed: Apr. 4, 2013

(65) Prior Publication Data

US 2013/0269848 A1 Oct. 17, 2013

(30) Foreign Application Priority Data

Apr. 13, 2012 (JP) .................................. 2012-92291

(51) Int. Cl.
*B60C 11/03* (2006.01)
*B60C 11/12* (2006.01)

(52) U.S. Cl.
CPC ............. *B60C 11/03* (2013.01); *B60C 11/0304* (2013.04); *B60C 11/1236* (2013.04); *B60C 11/0302* (2013.04); *B60C 2011/0367* (2013.04); *B60C 2011/0383* (2013.04);
(Continued)

(58) Field of Classification Search
CPC ............. B60C 11/0304; B60C 11/033; B60C 11/0302; B60C 11/12; B60C 2011/0367; B60C 2011/0379
USPC ................. 152/209.8, 209.9, 209.18, 209.28, 152/DIG. 3
See application file for complete search history.

(56) References Cited

U.S. PATENT DOCUMENTS 4,667,717 A * 5/1987 Graas ........................ 152/209.18
5,421,391 A * 6/1995 Himuro .................... 152/209.18
(Continued)

FOREIGN PATENT DOCUMENTS

EP 0688685 * 12/1995
JP 06-001119 * 1/1994
(Continued)

OTHER PUBLICATIONS

English machine translation of JP09-226323, dated Sep. 1997.*

*Primary Examiner* — Justin Fischer
*Assistant Examiner* — Robert Dye
(74) *Attorney, Agent, or Firm* — Thorpe North & Western

(57) ABSTRACT

A pneumatic tire is provided which includes a plurality of drainage grooves positioned on each side of a tire equator line that extend at an angle in a direction opposite a rotating direction while curving outward in a tire width direction in a tread portion, with an end of a leading edge closed and an end of a trailing edge open to a tire side. A plurality of sub grooves extending from the drainage grooves in the rotating direction is provided, where an end of the leading edge is closed. The drainage grooves and the sub grooves are arranged so that spacings W1, W2, and W3 gradually increase outward in the tire width direction, groove area ratios $R_A$ to $R_E$ satisfy the relationships $|R_B-R_A| \leq 9\%$, $R_A > R_C > R_D$, and $R_B > R_E$, and a groove depth of the drainage grooves in the center region is greater than that in the shoulder portion.

20 Claims, 3 Drawing Sheets

(52) U.S. Cl.
CPC ...... *B60C 2011/0381* (2013.04); *B60C 11/033* (2013.04); *B60C 2011/0353* (2013.04); *B60C 2011/0376* (2013.04); *Y10S 152/03* (2013.01)
USPC .............. 152/209.8; 152/209.18; 152/209.28; 152/DIG. 3

(56) References Cited

U.S. PATENT DOCUMENTS 6,206,064 B1 * 3/2001 Takahashi ................ 152/209.24
7,958,921 B2 * 6/2011 Ishiguro et al. .......... 152/209.18
2011/0067794 A1 * 3/2011 Endou et al. ............. 152/209.18

FOREIGN PATENT DOCUMENTS

| JP | 09-226323 | * | 9/1997 |
|----|-----------|---|--------|
| JP | 2007-238060 | | 9/2007 |
| JP | 2009-202812 | | 9/2009 |
| JP | 2010-184570 | | 8/2010 |
| JP | 2010-215078 | | 9/2010 |

* cited by examiner

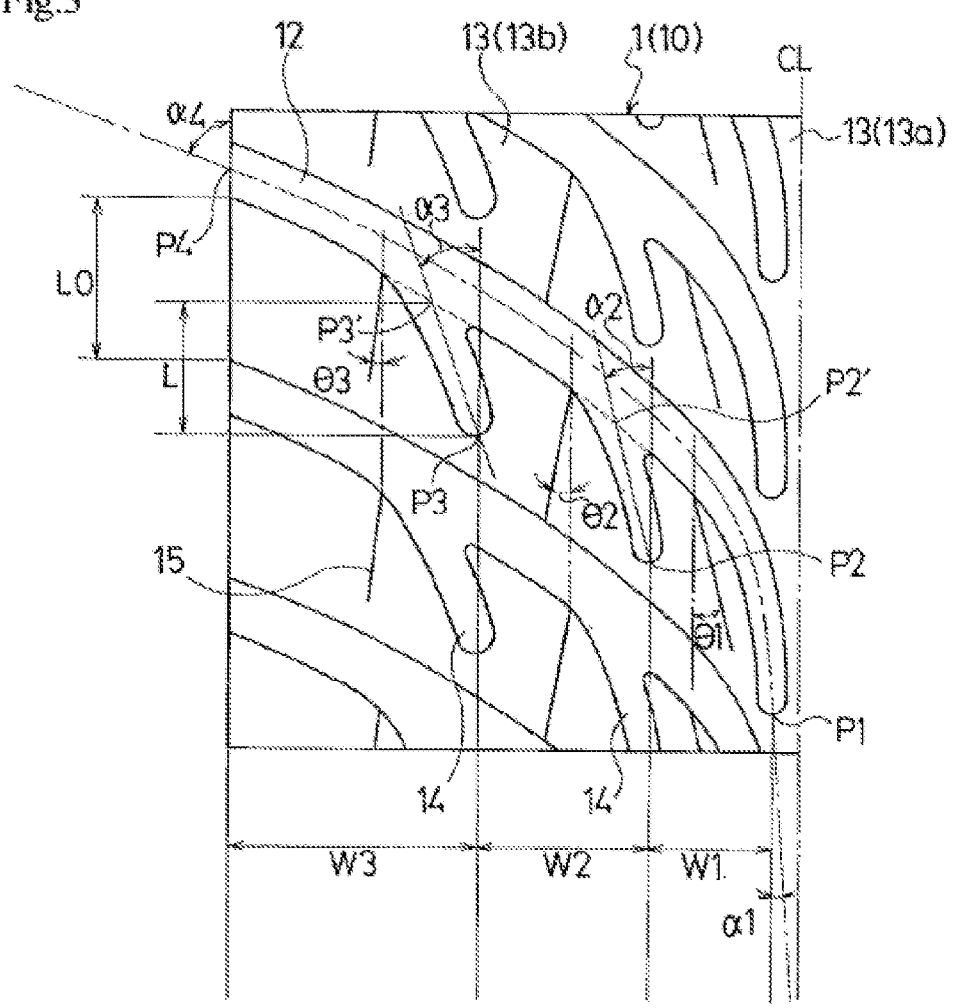

PNEUMATIC TIRE

PRIORITY CLAIM

Priority is claimed to Japan Patent Application Serial No. 2012-92291 filed on Apr. 13, 2012.

BACKGROUND

1. Technical Field

The present technology relates to a pneumatic tire that is ideal for racing, and more particularly relates to a pneumatic tire capable of improving uneven wear resistance and warming up performance, while improving running performance when traveling straight and when cornering on wet road surfaces.

2. Related Art

Tires provided with a plurality of main grooves extending in a tire circumferential direction in a tread portion are normally used as wet tires for racing. It is recognized that superior running performance of such tires on wet road surfaces are exhibited based on a drainage capability of the main grooves. However, in high-speed races, an amount of water pushed back forward increases since water cannot be drained by the main grooves in tires having a tread pattern with main grooves extending in the tire circumferential direction as a main constituent, which results in an occurrence of a hydroplaning phenomenon. Also, in races with GT touring cars having tire housings, there is an adverse effect whereby water remains in tire housings when tires having a tread pattern with main grooves extending in the tire circumferential direction as the main constituent are used. Thus, a groove arrangement that can drain water on road surfaces in a tire lateral direction is required.

As a wet tire for racing meeting such a demand, a tire has been proposed including, in a tread portion, a main groove extending in a tire circumferential direction in a tread center position, a plurality of first angled grooves that is in communication with the main groove and that extends at an angle in a direction opposite a rotating direction from the tread center position toward each shoulder side, and a plurality of second angled grooves that is not in communication with the main groove and that extends at an angle in the same direction as the respective first angled grooves while intersecting at least three of the first angled grooves, wherein a plurality of blocks is partitioned by the main groove and the angled grooves (for example, see Japanese Unexamined Patent Application Publication No. 2007-238060A).

However, when the tread portion is partitioned into a plurality of blocks by the main groove and the angled grooves as disclosed above, a rigidity of the tread portion deteriorates. Since a large load is applied to tires when braking and driving and when cornering in racing, there is a problem that a necessary braking and driving performance and turning performance on wet road surfaces cannot be exhibited when the rigidity of the tread portion is insufficient.

In addition, in recent years, there is a demand to improve uneven wear resistance in addition to running performance when traveling straight and when cornering on wet road surfaces as described above, in order to solve the problem that the required tire performance cannot be obtained due to the occurrence of uneven wear in the tire. Also, in order for a tire to exhibit its intended performance, it is necessary that the tire temperature be a certain temperature, however, in particular on wet road surfaces, it tends to take time until the tire temperature for exhibiting the intended tire performance is reached, so there is a demand to shorten this arrival time (to improve the warming up performance).

SUMMARY

The present technology provides a pneumatic tire that is capable of improving uneven wear resistance and warming up performance, while improving the running performance when traveling straight and when cornering on wet road surfaces.

The pneumatic tire according to the present technology is a pneumatic tire having a designated rotating direction, wherein a plurality of drainage grooves positioned on each side of a tire equator line that extend at an angle in a direction opposite the rotating direction while curving outward in a tire width direction is provided in a tread portion; an end of a leading edge of the drainage grooves is closed and an end of a trailing edge of the drainage grooves is open to a tire side; an inclination angle to a tire circumferential direction at a terminal center position of the leading edge of the drainage grooves is from 0° to 45°, while an inclination angle to the tire circumferential direction at a terminal center position of the trailing edge of the drainage grooves is from 65° to 90°; land portions including a rib section continuously extending along the tire equator line and a plurality of branched sections continuously extending branched from the rib section outward in the tire width direction are formed in the tread portion; a plurality of sub grooves extending from the drainage grooves in the rotating direction is provided in each of the branched sections; an end of the leading edge of the sub grooves is closed; when obtaining a spacing in the tire width direction between the terminal center position of the leading edge of the drainage groove and the tire equator line, a spacing in the tire width direction between the terminal center position of the leading edge of the drainage groove and the terminal center position of the leading edge of the sub groove located closest to the tire equator line, a spacing in the tire width direction between the terminal center positions of the leading edges of adjacent sub grooves, and a spacing in the tire width direction between the terminal center position of the leading edge of the sub groove located outermost in the tire width direction and the terminal center position of the trailing edge of the drainage groove, the drainage groove and the sub grooves are arranged so that these spacings gradually increase outward in the tire width direction; also when a region A is a range 0% to 17% of a ground contact width W outward in the vehicle mounting direction from the tire equator line CL, a region B is a range 0% to 33% of the ground contact width W inward in the vehicle mounting direction from the tire equator line CL, a region C is a range 17% to 33% of the ground contact width W outward in the vehicle mounting direction from the tire equator line CL, a region D is a range 33% to 50% of the ground contact width W outward in the vehicle mounting direction from the tire equator line CL, and a region E is a range 33% to 50% of the ground contact width W inward in the vehicle mounting direction from the tire equator line CL, a groove area ratio $R_A$ in region A, a groove area ratio $R_B$ in region B, a groove area ratio $R_C$ in region C, a groove area ratio $R_D$ in region D, and a groove area ratio $R_E$ in region E satisfy the relationships $|R_B - R_A| \leq 9\%$, $R_A > R_C > R_D$, and $R_B > R_E$; and a groove depth of the drainage grooves in a center region X, located between a position at 20% of the ground contact width W inward in the tire mounting direction from the tire equator line CL and a position at 10% of the ground contact width W outward in the tire mounting direction from the tire equator line CL, is greater than a groove depth of the drainage grooves in a shoulder portion Y located at an edge of the ground contact width.

According to the present technology, instead of a main groove extending in the tire circumferential direction, a plurality of drainage grooves that extend at an angle in a direction opposite the rotating direction while curving outward in the tire width direction, and that have an end of a trailing edge open to a tire side, as well as a plurality of sub grooves extending from the drainage grooves in the rotating direction are adopted. Therefore, when traveling on wet road surfaces, water on road surfaces is drained in the tire lateral direction, and the amount of water pushed back forward can thus be reduced. It is thus possible to guarantee sufficient hydroplaning prevention performance when traveling straight. Also, in races with GT touring cars having tire housings, water can be prevented from remaining in the tire housings.

Furthermore, since land portions including a rib section continuously extending along the tire equator line and a plurality of branched sections continuously extending branched from the rib section outward in the tire width direction are formed in the tread portion, sufficient rigidity of the tread portion can be guaranteed. It therefore becomes possible for superior braking and driving performance and turning performance to be achieved on wet road surfaces. As a result, running performance on wet road surfaces when traveling straight and when cornering can be improved beyond that which was conventionally possible.

In the present technology, in addition to making the inclination angle to the tire circumferential direction at the terminal center position of the leading edge of the drainage grooves from 0° to 45° and making the inclination angle to the tire circumferential direction at the terminal center position of the trailing edge of the drainage grooves from 60° to 90°, it is also necessary to make the inclination angle to the tire circumferential direction of the sub grooves greater than the inclination angle to the tire circumferential direction at the terminal center position of the leading edge of the drainage grooves. It is further necessary to make the inclination angle to the tire circumferential direction increase toward the sub grooves positioned farther outward in the tire width direction in order to guarantee favorable water drainage performance.

Also, in the present technology, a plurality of sub grooves extending in the rotating direction from the drainage grooves is provided in each of the branched sections, an end of the leading edge of the sub grooves is closed; when obtaining a spacing in the tire width direction between the terminal center position of the leading edge of the drainage groove and the tire equator line, a spacing in the tire width direction between the terminal center position of the leading edge of the drainage groove and the terminal center position of the leading edge of the sub groove located closest to the tire equator line, a spacing in the tire width direction between the terminal center positions of the leading edges of adjacent sub grooves, and a spacing in the tire width direction between the terminal center position of the leading edge of the sub groove located outermost in the tire width direction and the terminal center position of the trailing edge of the drainage groove, the drainage groove and the sub grooves are arranged so that these spacings gradually increase outward in the tire width direction, a groove area ratio $R_A$ in region A, a groove area ratio $R_B$ in region B, a groove area ratio $R_C$ in region C, a groove area ratio $R_D$ in region D, and a groove area ratio $R_E$ in region E satisfy the relationships $|R_B - R_A| \leq 9\%$, $R_A > R_C > R_D$, and $R_B > R_E$, and a groove depth of the drainage grooves in a center region X is greater than a groove depth of the drainage grooves in a shoulder portion Y located at an edge of the ground contact width, so it is possible to improve the hydroplaning prevention performance on the tire equator line side when traveling straight and improve the warming up performance by reducing the tire rigidity, and maintain a relatively high tire rigidity outward in the tire width direction so it is possible to maintain the steering stability at a high degree. In particular, regions A to E are set as described above, so in GT touring cars that are given a camber angle, the region where the groove area ratio is large inward in the vehicle mounting direction can be made wider, so it is possible to effectively improve the hydroplaning prevention performance when traveling straight, the warming up performance, and the steering stability simultaneously.

In the present technology, preferably, the groove area ratio $R_A$ and the groove area ratio $R_B$ are greater than 40% and not more than 50%, the groove area ratio $R_C$ is greater than 30% and not more than 40%, and the groove area ratio $R_D$ and the groove area ratio $R_E$ are not more than 30%. By specifying the ranges of the groove area ratios in each region in this manner, it is possible to more effectively achieve the hydroplaning prevention performance when traveling straight, the uneven wear performance, the warming up performance, and the steering stability simultaneously.

In the present technology, preferably, two of the sub grooves are provided for every one of the drainage grooves; the spacing W2 in the tire width direction between the terminal center position of the leading edge of the sub groove located closest to the tire equator line and the terminal center position of the leading edge of the sub groove located outermost in the tire width direction is from 1.2 to 1.6 times the spacing W1 in the tire width direction between the terminal center position of the leading edge of the drainage groove and the terminal center position of the leading edge of the sub groove located closest to the tire equator line; and the spacing W3 in the tire width direction between the terminal center position of the leading edge of the sub groove located outermost in the tire width direction and the terminal center position of the trailing edge of the drainage groove is from 2.0 to 2.4 times the spacing W1. By arranging the drainage groove and the sub grooves in this manner, the rigidity is reduced near the tire equator line, which is a low load ground contact area, and the rigidity is increased outward in the tire width direction, which is a high load ground contact area, so it is possible to more effectively achieve the hydroplaning prevention performance when traveling straight, the warming up performance, the uneven wear performance, and steering stability simultaneously.

In the present technology, preferably, the groove depth of the drainage grooves in the center region X is from 120% to 190% of the groove depth of the drainage grooves in the shoulder portion Y, the groove width of the drainage grooves in the center region X is from 3 mm to 15 mm, and the groove wall angle of the drainage grooves in the center region X is from 0° to 45°. By setting the dimensions of the drainage grooves in the center region X in this manner, it is possible to more effectively improve the warming up performance.

In the present technology, preferably, a plurality of sipes is provided in each branched section, extending from the drainage groove in the rotating direction; and the inclination angle of each of the sipes to the tire circumferential direction becomes smaller from the tire equator line toward the edge of the ground contact width. By arranging the sipes in this manner, traction is generated when the inclination angle is large on the tire equator line side where the load is low, and traction is generated by reducing the inclination angle outward in the tire width direction where the load is high and the slip angle is large, so the road surface input is easily received and the input to the tire is increased, and the warming up performance can be improved.

In the present technology, the ground contact width is the width in the tire width direction of the portion of the tire that contacts a flat surface, when the tread portion of the tire is brought into contact with the flat surface under the static load radius measurement conditions defined by JATMA, TRA, or ETRTO, or the like. However, in the case of racing tires, the ground contact width is measured on the footprint when the tire is fitted to a rim, under conditions of 180 kPa air pressure and 4 kN load.

BRIEF DESCRIPTION OF THE DRAWINGS

FIG. 3 is an enlarged plan view illustrating the main part of FIG. 2.

DETAILED DESCRIPTION

Figure 1:
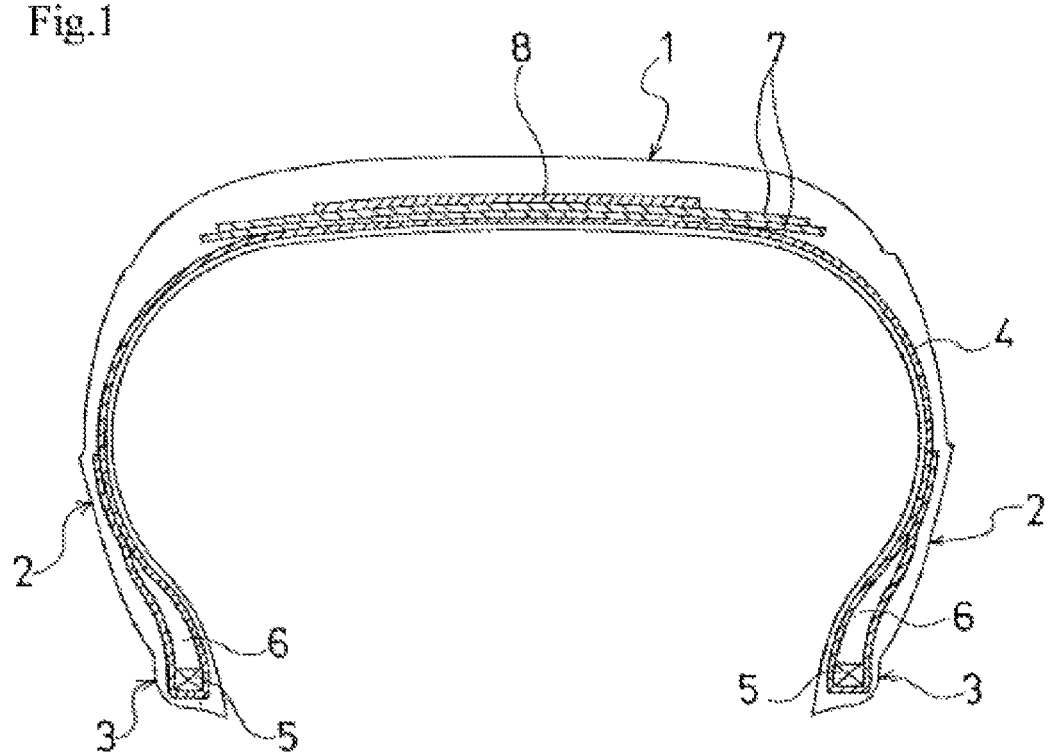
FIG. 1 is a meridian cross-sectional view of a pneumatic tire according to an embodiment of the present technology.
Figure 2:
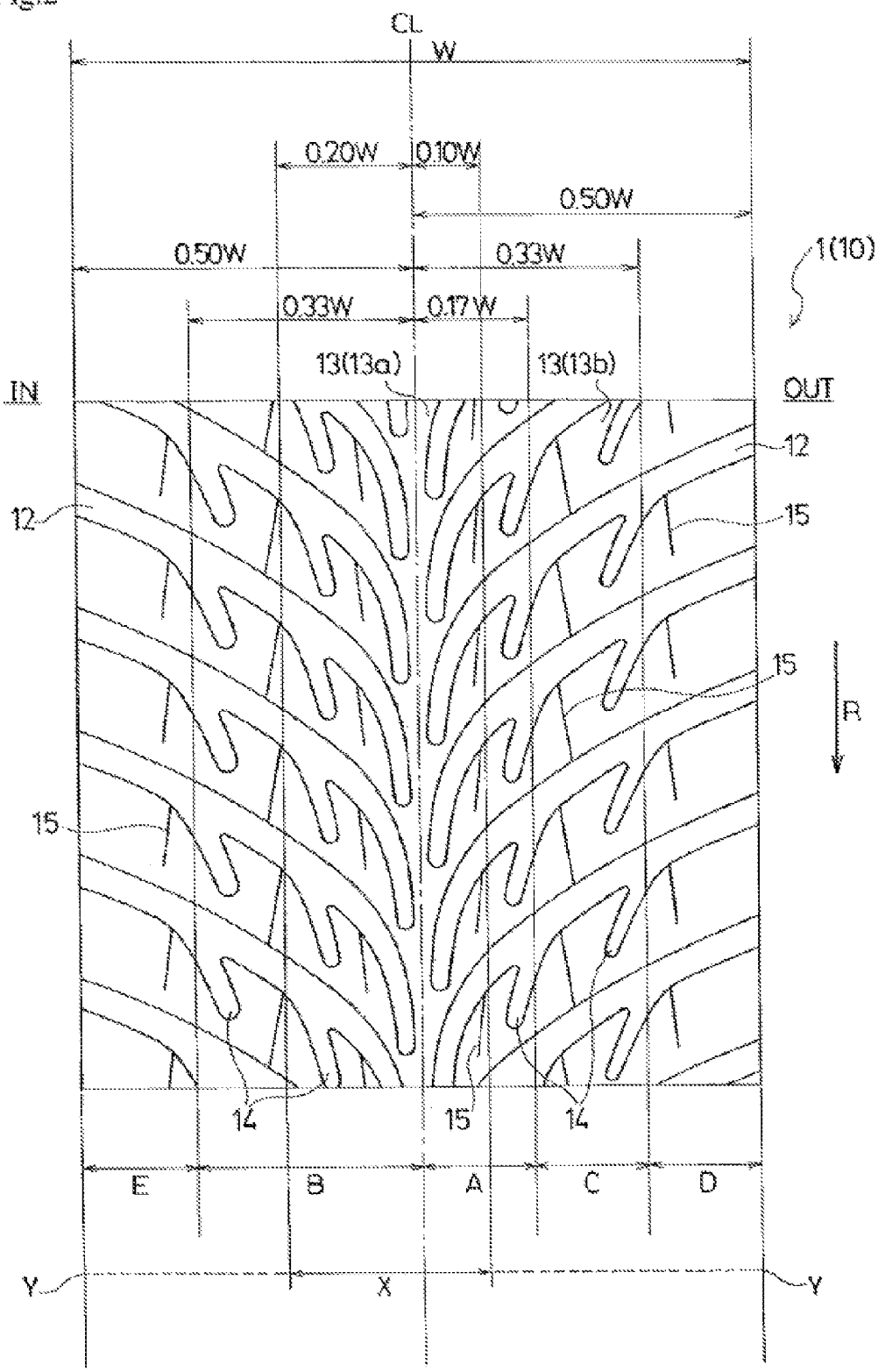
FIG. 2 is a development view illustrating a tread pattern of the pneumatic tire according to the embodiment of the present technology.

Detailed descriptions will be given below of a configuration of the present technology with reference to the accompanying drawings. FIG. 1 is a meridian cross-sectional view of a pneumatic tire according to an embodiment of the present technology. FIG. 2 illustrates a tread pattern of the pneumatic tire according to the embodiment of the present technology. FIG. 3 is an enlarged view illustrating the main part of FIG. 2. This pneumatic tire has a designated rotating direction R.

In FIG. 1, 1 is a tread portion; 2 is a side wall portion; and 3 is a bead portion. The carcass layer 4 is mounted between the left-right pair of bead portions 3. The carcass layer 4 includes a plurality of reinforcing cords extending in a tire radial direction, and is folded back around a bead core 5 disposed in each of the bead portions 3 from a tire inner side to a tire outer side. Additionally, a bead filler 6 is disposed on a periphery of the bead core 5, and the bead filler 6 is enveloped by a main body part and the folded over part of the carcass layer 4.

On the other hand, a plurality of layers of a belt layer 7 is embedded on an outer circumferential side of the carcass layer 4 in the tread portion 1. These belt layers 7 include a plurality of reinforcing cords that incline with respect to the tire circumferential direction and the reinforcing cords are disposed between the layers so as to intersect each other. In the belt layers 7, an inclination angle of the reinforcing cords to the tire circumferential direction is set in a range from, for example, 10° to 40°. In addition, a belt reinforcing layer 8 including fiber cords oriented in the tire circumferential direction is disposed on the outer circumferential side of the belt layers 7. A cord angle of the belt reinforcing layer 8 to the tire circumferential direction is 5° or less and more preferably 3° or less.

The present technology is applied to such a general pneumatic tire, however, the specific structure thereof is not limited to the basic structure described above.

As illustrated in FIG. 2, a plurality of drainage grooves 12 positioned on each side of a tire equator line CL that extend at an angle in a direction opposite the rotating direction R while curving outward in the tire width direction is formed in the tread portion 1 (tread surface 10) at intervals in the tire circumferential direction. The drainage grooves 12 are formed with an end of a leading edge (an end on the tire equator line side) closed and an end of a trailing edge (an end on the outward in the tire width direction) open to a tire side. The drainage grooves 12 are the main drainage means in the tread portion 1. Preferably, the drainage grooves 12 have a groove width from 3.0 mm to 20 mm and a groove depth from 2.5 mm to 8.0 mm. Thereby, land portions 13 including a rib section 13a continuously extending along the tire equator line CL and a plurality of branched sections 13b continuously extending branched from the rib section 13a outward in the tire width direction are formed in the tread portion 1.

In each branched section 13b, a plurality of sub grooves 14 extending from the drainage grooves 12 toward rotating direction R is formed. In this embodiment, two of the sub grooves 14 are formed in each branched section 13b. The sub grooves 14 are formed so that the end of the trailing edge is in communication with the drainage grooves 12 while the end of the leading edge is closed. The sub grooves 14 are drainage means assisting the drainage grooves 12. Preferably, the sub grooves 14 have a groove width from 3.0 mm to 12.0 mm and a groove depth from 2.5 mm to 8.0 mm.

In the aforementioned pneumatic tire, the plurality of drainage grooves 12 that extend at an angle in the direction opposite the rotating direction R while curving outward in the tire width direction and that have the end of the trailing edge open to the tire side, and the plurality of sub grooves 14 that extend from the drainage grooves 12 in the rotating direction R support the drainage function. Therefore, when traveling on wet road surfaces, water on road surfaces is drained toward the tire lateral direction, and thus the amount of water pushed back forward with tire rotation can be reduced. Particularly, since the drainage grooves 12 are smoothly curved over their entire length, the flow of water in the drainage grooves 12 is smooth, thus, making it possible to effectively direct such water in the tire lateral direction. It is thus possible to guarantee sufficient hydroplaning prevention performance when traveling straight. Also, in races with GT touring cars having tire housings, water remaining in the tire housing can be avoided.

Furthermore, since the land portions 13 including the rib section 13a continuously extending along the tire equator line CL and the plurality of branched sections 13b continuously extending branched from the rib section 13a outward in the tire width direction are formed in the tread portion 1, sufficient rigidity of the tread portion 1 can be guaranteed, thus making it possible for superior braking and driving performance and turning performance to be exhibited on wet road surfaces. That is, by using a tread pattern not having independent blocks surrounded by the drainage grooves 12 on all four sides, sufficient rigidity of the tread portion 1 can be guaranteed. Thus, running performance on wet road surfaces when traveling straight and when cornering can be improved. Guaranteeing sufficient rigidity of the tread portion 1 is also advantageous for wear resistance.

As illustrated in FIG. 3, an inclination angle $\alpha 1$ to the tire circumferential direction at a terminal center position P1 of the leading edge of the drainage grooves 12 is from 0° to 45°. When the inclination angle $\alpha 1$ exceeds 45°, drainage ability in the tread center region deteriorates. In contrast, an inclination angle $\alpha 4$ to the tire circumferential direction at a terminal center position P4 of the trailing edge of the drainage grooves 12 is from 65° to 90°. When the inclination angle $\alpha 4$ is less than 65°, rigidity of the tread portion 1 in the shoulder region is insufficient. Also, preferably, inclination angles $\alpha 2$ and $\alpha 3$ to the tire circumferential direction of the sub grooves 14 are greater than the inclination angle $\alpha 1$ to the tire circumferential direction at the terminal center position P1 of the leading edge of the drainage grooves 12, and the inclination angles $\alpha 2$ and α3 to the tire circumferential direction increase toward the sub grooves 14 located further outward in the tire width direction. In other words, preferably, the inclination angles have the size relationship α1<α2<α3. By satisfying this relationship, it is possible to drain water effectively on road surfaces in the tire lateral direction when traveling on wet road surfaces. The inclination angles α2 and α3 are the inclination angles to the tire circumferential direction of straight lines connecting the terminal center positions P2, P3 of the leading edge with the terminal center positions P2', P3' of the trailing edge of the sub grooves 14, respectively.

In addition, in the aforementioned pneumatic tire, the length L in the tire circumferential direction of each sub groove 14 is preferably 50% or more and is more preferably from 50% to 95% of the length L0 in the tire circumferential direction of each branched section 13b. In this way, the drainage performance based on the sub grooves 14 is further improved. When the length L of the sub grooves 14 is less than 50% of the length of the branched sections 13b, effect of improving water drainage performance deteriorates, but conversely, when greater than 95%, braking and driving performance and turning performance on wet road surfaces deteriorates since there is significant deterioration in the rigidity of the tread portion 1.

Preferably, the difference between the inclination angle α1 to the tire circumferential direction at the terminal center position P1 of the leading edge of the drainage grooves 12 and the inclination angle α2 to the tire circumferential direction of the sub grooves 14 located closest to the tire equator line CL side is from 5° to 10°, and the difference between the inclination angles α2 and α3 to the tire circumferential direction between adjacent sub grooves 14 is from 5° to 10°. Water drainage performance based on the sub grooves 14 can thus be improved thereby. When the differences between the inclination angles α1 to α3 are outside the aforementioned ranges, effect of improving water drainage performance is insufficient.

Also, in the pneumatic tire according to the present technology, when obtaining the spacing W1 in the tire width direction between the terminal center position P1 of the leading edge of the drainage groove 12 and the terminal center position P2 of the leading edge of the sub groove 14 located closest to the tire equator line CL side, the spacing W2 in the tire width direction between the terminal center positions P2 and P3 of the leading edges of adjacent sub grooves 14, and the spacing W3 in the tire width direction between the terminal center position P3 of the leading edge of the sub groove 14 positioned outermost in the tire width direction and the terminal center position P4 of the trailing edge of the drainage groove 12, the drainage groove 12 and the sub grooves 14 are arranged so that these spacings W1 to W3 gradually increase outward in the tire width direction. Rigidity of the tread portion 1 is made appropriate thereby, thus making it possible for favorable running performance to be exhibited in accordance with load fluctuation.

That is, with fluctuation in the load applied to a tire, since the tread center area mainly contacts the ground in a low load area while areas to the shoulder contact the ground in a high load area, the necessary pattern rigidity in the low load area is less than the necessary pattern rigidity in the high load area. Thus, by making the rigidity of the tread center area relatively low and increasing the rigidity toward the shoulder sides based on the setting of the aforementioned spacings W1 to W3, it is possible to exhibit favorable running performance in accordance with load fluctuation.

In this case, preferably, the spacing W2 is from 1.2 to 1.6 times the spacing W1, and the spacing W3 is from 2.0 to 2.4 times the spacing W1. By setting the ratios of the spacings W2 and W3 relative to the spacing W1 in this manner, it is possible for favorable running performance to be exhibited more effectively in accordance with load fluctuation. If the spacing W2 is less than 1.2 times the spacing W1, it is not possible to obtain the necessary pattern rigidity. If the spacing W2 is greater than 1.6 times the spacing W1, the rigidity is too large and the warming up performance becomes poorer. If the spacing W3 is less than 2.0 times the spacing W1, it is not possible to obtain the necessary pattern rigidity. If the spacing W3 is greater than 2.4 times the spacing W1, the rigidity is too large and the warming up performance becomes poorer.

In the present technology, in the pneumatic tire as described above, a region A is a range 0% to 17% of a ground contact width W outward in the vehicle mounting direction from the tire equator line CL, a region B is a range 0% to 33% of the ground contact width W inward in the vehicle mounting direction from the tire equator line CL, a region C is a range 17% to 33% of the ground contact width W outward in the vehicle mounting direction from the tire equator line CL, a region D is a range 33% to 50% of the ground contact width W outward in the vehicle mounting direction from the tire equator line CL, and a region E is a range 33% to 50% of the ground contact width W inward in the vehicle mounting direction from the tire equator line CL. When the tread portion 1 is divided into regions A to E in this way, a groove area ratio $R_A$ in region A, a groove area ratio $R_B$ in region B, a groove area ratio $R_C$ in region C, a groove area ratio $R_D$ in region D, and a groove area ratio $R_E$ in region E satisfy the relationships $|R_B-R_A|\leq 9\%$, $R_A>R_C>R_D$, and $R_B>R_E$.

In other words, the difference in the groove area ratios $R_A$ of the region (region A) close to the tire equator line outward in the vehicle mounting direction and the groove area ratios $R_B$ of the region (region B) close to the tire equator line CL inward in the vehicle mounting direction is kept small, and the groove area ratio becomes smaller from the tire equator line side outward in the tire width direction for both the outward in the vehicle mounting direction and the inward in the vehicle mounting direction.

By setting the groove area ratios in this manner, for load fluctuations applied to the tire outward in the vehicle mounting direction, the rigidity on the tire equator line side is lower, but the rigidity increases as the outward in the tire width direction is approached, so the steering stability is maintained by the relatively high rigidity outward in the tire width direction, the hydroplaning prevention performance when traveling straight is improved by the lower rigidity on the tire equator line side, and the warming up performance can be improved. Likewise, for load fluctuations applied to the tire inward in the vehicle mounting direction, the rigidity on the tire equator line side is lower, but the rigidity increases as the outward in the tire width direction is approached, so likewise the steering stability is maintained by the relatively high rigidity outward in the tire width direction, the hydroplaning prevention performance when traveling straight is improved by the lower rigidity on the tire equator line side, and the warming up performance can be improved. In particular, in GT touring cars that are given a camber angle (negative camber), by increasing the groove area ratio and widening the areas inward in the vehicle mounting direction, the areas with low rigidity are made wider inward in the vehicle mounting direction where the ground contact pressure is higher, so it is possible to more effectively obtain the above affect.

In this case, if the relationship between the groove area ratio $R_A$ and the groove area ratio $R_B$ is $|R_B-R_A|>9\%$, the rigidity of one of either region A or region B becomes relatively high and it is not possible to reduce it sufficiently, so it is not possible to sufficiently obtain the effect of improving the hydroplaning prevention performance when traveling straight or improving the warming up performance.

Also, because the difference in rigidity is increased, uneven wear can easily occur. If the groove area ratio $R_A$, the groove area ratio $R_C$ and the groove area ratio $R_D$ do not satisfy the relationship $R_A > R_C > R_D$, the hydroplaning prevention performance when traveling straight, the warming up performance, and the steering stability effects as described above cannot be simultaneously obtained. In particular, if the relationship between the groove area ratios is reversed, and the relationship becomes $R_A < R_C < R_D$, the rigidity outward in the tire width direction becomes relatively high, so the steering stability deteriorates. In addition, if the groove area ratio $R_B$ and the groove area ratio $R_E$ do not satisfy the relationship $R_B > R_E$, and the relationship becomes $R_B < R_E$, the rigidity outward in the tire width direction becomes relatively high, so the steering stability deteriorates.

In the present technology, the groove area ratios $R_A$ to $R_E$ should satisfy the above size relationships, but preferably the groove area ratio $R_A$ and the groove area ratio $R_B$ are greater than 40% and not more than 50%, the groove area ratio $R_C$ is greater than 30% and not more than 40%, and the groove area ratio $R_D$ and the groove area ratio $R_E$ are not more than 30%.

By specifying the ranges of the groove area ratios $R_A$ to $R_E$ in this manner, it is possible to more effectively achieve the hydroplaning prevention performance when traveling straight, the warming up performance, and the steering stability as described above simultaneously.

In this case, if the groove area ratio $R_A$ and the groove area ratio $R_B$ are 40% or less, it is not possible to sufficiently reduce the rigidity in region A and in region B, so the effect of improving the hydroplaning prevention performance when traveling straight and the warming up performance is reduced. If the groove area ratio $R_A$ and the groove area ratio $R_B$ exceed 50%, the rigidity in region A and in region B is too low, so the steering stability deteriorates. If the groove area ratio $R_C$ is 30% or less, the effect of improving the hydroplaning prevention performance and the warming up performance is reduced. If the groove area ratio $R_C$ exceeds 40%, the steering stability deteriorates. If the groove area ratio $R_D$ and the groove area ratio $R_E$ exceed 30%, the rigidity of the regions (region D and region E) that are outermost in the tire width direction becomes too low, so the steering stability is reduced.

In the present technology, in addition to setting the groove area ratios as described above, the groove depth of the drainage grooves 12 in a center region X, between a position 20% of the ground contact width W inward in the tire mounting direction from the tire equator line CL and a position 10% of the ground contact width W outward in the tire mounting direction from the tire equator line CL, is greater than the groove depth of the drainage grooves 12 in a shoulder portion Y located at the edge of the ground contact width.

By setting the groove depth of the drainage grooves 12 in the center region X greater than that in the shoulder portion Y in this way, it is possible to improve the water drainage performance in the center region X, and improve the hydroplaning prevention performance when traveling straight. Also, because the drainage grooves 12 are deep, it is possible to reduce the rigidity, so it is possible to improve the warming up performance. Also, the area where the groove depth of the drainage grooves 12 is made deeper is limited to the center region X, so it is possible to maintain rigidity of the shoulder portion Y and maintain a high steering stability. Also, as in the case for the groove area ratios as described above, for the groove depth of the drainage grooves 12 also, the region where the grooves are deeper inward in the vehicle mounting direction is wider, so for GT touring cars that are given a camber angle (negative camber), inward in the vehicle mounting direction where the ground contact pressure is higher, the low rigidity region is made wider, so it is possible to more effectively obtain the hydroplaning prevention performance when traveling straight, the warming up performance, and the steering stability as described above simultaneously.

In this case, if the size relationship of the groove depth of the drainage grooves 12 in the center region X and that in the shoulder portion Y is reversed, the water drainage performance in the center region X will be reduced, and the rigidity of the shoulder portion Y will be reduced relative to the center region X, so it is not possible to obtain the hydroplaning prevention performance when traveling straight, the warming up performance, and the steering stability as described above.

In the present technology, the groove depth of the drainage grooves 12 should satisfy the size relationship as described above, but preferably the groove depth of the drainage grooves 12 in the center region X is from 120% to 190% of the groove depth of the drainage grooves 12 in the shoulder portion Y. In this case, if the groove depth of the drainage grooves 12 in the center region X is less than 120% of the groove depth of the drainage grooves 12 in the shoulder portion Y, it is not possible to increase the water drainage performance sufficiently and the effect of increasing the hydroplaning prevention performance when traveling straight is reduced. If the groove depth of the drainage grooves 12 in the center region X is greater than 190% of the groove depth of the drainage grooves 12 in the shoulder portion Y, the rigidity is insufficient.

In addition, preferably, the groove width of the drainage grooves 12 in the center region X is from 3 mm to 15 mm, and the groove wall angle of the drainage grooves 12 in the center region X is from 0° to 45°. If the groove width of the drainage grooves 12 in the center region X is less than 3 mm, the water drainage performance is reduced, and hydroplaning occurs. If the groove width of the drainage grooves 12 in the center region X is greater than 15 mm, the pattern rigidity is insufficient, and the steering stability performance is reduced. If the groove wall angle of the drainage grooves 12 in the center region X is greater than 45°, the pattern rigidity becomes too large and the effect of improving the hydroplaning prevention performance and the warming up performance is reduced.

Not only the drainage grooves 12, but also the sub grooves 14 also may have the depth of the portion in the center region X greater than the groove depth of the drainage grooves 12 in the shoulder portion Y, and preferably, the groove depth of the portion in the center region X is from 120% to 190% of the groove depth of the drainage grooves 12 in the shoulder portion Y. However, preferably, only the drainage grooves 12 satisfy the relationship for the groove depth as described above, from the viewpoint of steering stability.

In the present technology, as illustrated in FIGS. 2 and 3, preferably, a plurality of sipes 15 extending in the rotating direction from the drainage grooves 12 is formed in each branched section 13b. The sipes 15 are arranged so as to extend in a direction intersecting the drainage grooves 12. The inclination angles θ1 to θ3 of the sipes 15 to the tire circumferential direction may be from 0° to 30°. Also, the depth of the sipes 15 may be 75% or less of the depth of the drainage grooves 12 and is preferably from 25% to 75%. In particular, in the branched sections 13b, the sipes 15 may be disposed at spacings in the width direction so as to substantially divide in two the parallelogram portions divided by the sub grooves 14. By the addition of such sipes 15, rigidity of the tread portion 1 is made appropriate, thus making it possible to firmly grip the road surface. In the present technology, the sipes 15 have a width from 0.4 mm to 1.5 mm.

More preferably, the inclination angles θ1 to θ3 of each sipe 15 to the tire circumferential direction becomes smaller from the tire equator line side toward the ground contact edge, satisfying the relationship θ1>θ2>θ3. By varying the inclination angle of the sipes 15 in this manner, traction is generated when the inclination angle is large at the tire equator line side where the load is low, and traction is generated by reducing the inclination angle outward in the tire width direction where the load is high and the slip angle is large, so the road surface input is easily received and the input to the tire is increased, and the warming up performance can be improved. In this case, if the inclination angles θ1 to θ3 of the sipes 15 do not satisfy the above size relationship, it is not possible to obtain sufficient traction, and the effect of improving the warming up performance is reduced.

EXAMPLES

Twenty one types of pneumatic tire, Conventional Example 1, Comparative Examples 1 to 4, and Working Examples 1 to 16, having a designated rotating direction were produced. The tires had a plurality of drainage grooves positioned on each side of the tire equator line that extend at an angle in a direction opposite the rotating direction while curving outward in the tire width direction was provided in a tread portion. An end of a leading edge of the drainage grooves was closed and an end of a trailing edge of the drainage grooves was open to the tire side. Land portions including a rib section continuously extending along the tire equator line and a plurality of branched sections continuously extending branched from the rib section outward in the tire width direction were formed in the tread portion. A plurality of sub grooves extending from the drainage grooves in the rotating direction was provided in each of the branched sections, an end of the leading edge of the sub grooves being closed. The inclination angles α1, α4 of the drainage grooves, the spacings W1 to W3, the groove depth DX of the drainage grooves in the center region X, the groove depth DY of the drainage grooves in the shoulder portion Y, the groove depth DX as a percentage of the groove depth DY (DX/DY×100), the groove area ratios $R_A$ to $R_E$, the difference between the groove area ratio $R_A$ and $R_B$ ($|R_A - R_B|$), the groove width of the drainage grooves in the center region X, the groove wall angle of the drainage grooves in the center region X, and the sipe angles θ1 to θ3 were set as shown in Tables 1 to 3.

The spacings W2 and W3 are shown as a proportion of the spacing W1. The size of the front tires was 330/710R18 and the size of the rear tires was 330/710R17.

The tread portion of Conventional Example 1 was divided equally into 6 portions, and the groove area ratios were set for these areas, corresponding to regions A to E with region B divided into two, so in the column for the groove area ratio $R_B$ in Tables 1 to 3, two values are given in the order "equator line side/outward in the tire width direction". Also, for the difference between the groove area ratio $R_A$ and $R_B$ ($|R_A - R_B|$) of Conventional Example 1, the value for the area on the equator line side was adopted as the groove area ratio $R_B$.

For these 21 pneumatic tires, the uneven wear resistance, the hydroplaning prevention performance, the wet steering stability, and the warming up performance were evaluated in accordance with the following evaluation methods, and the results are shown in Tables 1 to 3.

Uneven Wear Resistance

Each test tire was fitted to a standard rim (front: 18×13JJ, rear: 17×13JJ) and mounted on a racing car with a displacement of 4500 cc, inflated to an air pressure of 175 kPa, and test driven on the circuit on which water was sprayed. After 20 circuits, the difference in the amount of wear in the center portion and the shoulder portion was measured. Evaluation results were expressed as index values, Conventional Example 1 being assigned an index value of 100. Larger index values indicate superior uneven wear resistance.

Hydroplaning Prevention Performance

Each test tire was fitted to a standard rim (front: 18×13JJ, rear: 17×13JJ) and mounted on a racing car with a displacement of 4500 cc, inflated to an air pressure of 175 kPa, and test driven on the circuit on which water was sprayed. Sensory evaluation was performed by the test driver for the running performance when traveling straight on the wet road surface, and the hydroplaning prevention performance was evaluated. Evaluation results were expressed as index values, Conventional Example 1 being assigned an index value of 100. Larger index values indicate superior hydroplaning prevention performance.

Wet Steering Stability

Each test tire was fitted to a standard rim (front: 18×13JJ, rear: 17×13JJ) and mounted on a racing car with a displacement of 4500 cc, inflated to an air pressure of 175 kPa, and test driven on the circuit on which water was sprayed. Sensory evaluation was performed by the test driver for the running performance when cornering on the wet road surface, and the wet steering stability was evaluated. Evaluation results were expressed as index values, Conventional Example 1 being assigned an index value of 100. Larger index values indicate superior wet steering stability.

Warming Up Performance

Each test tire was fitted to a standard rim (front: 18×13JJ, rear: 17×13JJ) and mounted on a racing car with a displacement of 4500 cc, inflated to an air pressure of 175 kPa, and test driven on the circuit on which water was sprayed. After 5 circuits, the temperature of the tire was measured, and the warming up performance was evaluated. Evaluation results were expressed as index values, Conventional Example 1 being assigned an index value of 100. Larger index values indicate a shorter time to reach the temperature at which the tire can exhibit its intended performance, and indicates a superior warming up performance.

TABLE 1

|  |  | Conv. Ex. 1 | W.E. 1 | Comp. Ex. 1 | W.E. 2 | Comp. Ex. 2 | Comp. Ex. 3 | Comp. Ex. 4 |
|---|---|---|---|---|---|---|---|---|
| Inclination angle α1 | ° | 20 | 20 | 20 | 20 | 20 | 20 | 20 |
| Inclination angle α4 | ° | 75 | 75 | 75 | 75 | 75 | 75 | 75 |
| Spacing W1 | mm | 35 | 35 | 35 | 35 | 35 | 35 | 35 |
| Spacing W2/W1 |  | 1.4 | 1.7 | 0.6 | 1.7 | 1.7 | 1.7 | 1.7 |

TABLE 1-continued

|  |  | Conv. Ex. 1 | W.E. 1 | Comp. Ex. 1 | W.E. 2 | Comp. Ex. 2 | Comp. Ex. 3 | Comp. Ex. 4 |
| --- | --- | --- | --- | --- | --- | --- | --- | --- |
| Spacing W3/W1 |  | 2.2 | 2.5 | 0.5 | 2.5 | 2.5 | 2.5 | 2.5 |
| Groove depth DX of the drainage groove in the center region X | mm | 5 | 5 | 5 | 5 | 5 | 5 | 5 |
| Groove depth DY of the drainage groove in the shoulder portion Y | mm | 5 | 5 | 5 | 5 | 5 | 5 | 5 |
| DX/DY × 100 | % | 100 | 100 | 100 | 100 | 100 | 100 | 100 |
| Groove area ratio $R_E$ |  | 26 | 35 | 35 | 35 | 35 | 55 | 35 |
| Groove area ratio $R_B$ |  | 36/46 | 55 | 55 | 41 | 40 | 35 | 55 |
| Groove area ratio $R_A$ |  | 46 | 55 | 55 | 50 | 55 | 55 | 35 |
| $|R_A - R_B|$ |  | — | 0 | 0 | 9 | 15 | 20 | 20 |
| Groove area ratio $R_C$ |  | 36 | 45 | 45 | 45 | 45 | 45 | 45 |
| Groove area ratio $R_D$ |  | 26 | 35 | 35 | 35 | 35 | 35 | 35 |
| Groove width of the drainage groove in the center region X | mm | 10 | 20 | 20 | 20 | 20 | 20 | 20 |
| Groove wall angle of the drainage groove in the center region X | ° | 50 | 50 | 50 | 50 | 50 | 50 | 50 |
| Sipe angle θ1 | ° | 30 | 30 | 30 | 30 | 30 | 30 | 30 |
| Sipe angle θ2 | ° | 30 | 30 | 30 | 30 | 30 | 30 | 30 |
| Sipe angle θ3 | ° | 30 | 30 | 30 | 30 | 30 | 30 | 30 |
| Uneven wear resistance | Index value | 100 | 102 | 98 | 102 | 98 | 98 | 98 |
| Hydroplaning prevention performance | Index value | 100 | 101 | 99 | 100 | 100 | 98 | 99 |
| Wet steering stability | Index value | 100 | 100 | 100 | 100 | 100 | 98 | 98 |
| Warming up performance | Index value | 100 | 102 | 98 | 102 | 100 | 98 | 99 |

In Table 1, "Conv. Ex." is an abbreviation for "Conventional Example"; "W.E." is an abbreviation for "Working Example"; and "Comp. Ex." is an abbreviation for "Comparative Example."

TABLE 2

|  |  | W.E. 3 | W.E. 4 | W.E. 5 | W.E. 6 | Comp. Ex. 7 | Comp. Ex. 8 | Comp. Ex. 9 |
| --- | --- | --- | --- | --- | --- | --- | --- | --- |
| Inclination angle α1 | ° | 20 | 20 | 20 | 20 | 20 | 20 | 20 |
| Inclination angle α4 | ° | 75 | 75 | 75 | 75 | 75 | 75 | 75 |
| Spacing W1 | mm | 35 | 35 | 35 | 35 | 35 | 35 | 35 |
| Spacing W2/W1 |  | 1.7 | 1.7 | 1.7 | 1.7 | 1.7 | 1.4 | 1.1 |
| Spacing W3/W1 |  | 2.2 | 2.5 | 0.5 | 2.5 | 2.5 | 2.5 | 2.5 |
| Groove depth DX of the drainage groove in the center region X | mm | 5 | 5 | 5 | 5 | 5 | 5 | 5 |

TABLE 2-continued

|  |  | W.E. 3 | W.E. 4 | W.E. 5 | W.E. 6 | Comp. Ex. 7 | Comp. Ex. 8 | Comp. Ex. 9 |
|---|---|---|---|---|---|---|---|---|
| Groove depth DY of the drainage groove in the shoulder portion Y | mm | 5 | 5 | 5 | 5 | 5 | 5 | 5 |
| DX/DY × 100 | % | 100 | 100 | 100 | 100 | 100 | 100 | 100 |
| Groove area ratio $R_E$ |  | 26 | 35 | 35 | 35 | 35 | 55 | 35 |
| Groove area ratio $R_B$ |  | 36/46 | 55 | 55 | 41 | 40 | 35 | 55 |
| Groove area ratio $R_A$ |  | 46 | 55 | 55 | 50 | 55 | 55 | 35 |
| $|R_A - R_B|$ |  | — | 0 | 0 | 9 | 15 | 20 | 20 |
| Groove area ratio $R_C$ |  | 36 | 45 | 45 | 45 | 45 | 45 | 45 |
| Groove area ratio $R_D$ |  | 26 | 35 | 35 | 35 | 35 | 35 | 35 |
| Groove width of the drainage groove in the center region X | mm | 10 | 20 | 20 | 20 | 20 | 20 | 20 |
| Groove wall angle of the drainage groove in the center region X | ° | 50 | 50 | 50 | 50 | 50 | 50 | 50 |
| Sipe angle θ1 | ° | 30 | 30 | 30 | 30 | 30 | 30 | 30 |
| Sipe angle θ2 | ° | 30 | 30 | 30 | 30 | 30 | 30 | 30 |
| Sipe angle θ3 | ° | 30 | 30 | 30 | 30 | 30 | 30 | 30 |
| Uneven wear resistance | Index value | 100 | 102 | 98 | 102 | 98 | 98 | 98 |
| Hydroplaning prevention performance | Index value | 100 | 101 | 99 | 100 | 100 | 98 | 99 |
| Wet steering stability | Index value | 100 | 100 | 100 | 100 | 100 | 98 | 98 |
| Warming up performance | Index value | 100 | 102 | 98 | 102 | 100 | 98 | 99 |

In Table 2, "W.E." is an abbreviation for "Working Example"; and "Comp. Ex." is an abbreviation for "Comparative Example."

TABLE 3

|  |  | Conv. Ex. 1 | W.E. 1 | Comp. Ex. 1 | W.E. 2 | Comp. Ex. 2 | Comp. Ex. 3 | Comp. Ex. 4 |
|---|---|---|---|---|---|---|---|---|
| Inclination angle α1 | ° | 20 | 20 | 20 | 20 | 20 | 20 | 20 |
| Inclination angle α4 | ° | 75 | 75 | 75 | 75 | 75 | 75 | 75 |
| Spacing W1 | mm | 35 | 35 | 35 | 35 | 35 | 35 | 35 |
| Spacing W2/W1 |  | 1.4 | 1.7 | 0.6 | 1.7 | 1.7 | 1.7 | 1.7 |
| Spacing W3/W1 |  | 2.2 | 2.5 | 0.5 | 2.5 | 2.5 | 2.5 | 2.5 |
| Groove depth DX of the drainage groove in the center region X | mm | 5 | 5 | 5 | 5 | 5 | 5 | 5 |
| Groove depth DY of the drainage groove in the shoulder portion Y | mm | 5 | 5 | 5 | 5 | 5 | 5 | 5 |
| DX/DY × 100 | % | 100 | 100 | 100 | 100 | 100 | 100 | 100 |
| Groove area ratio $R_E$ |  | 26 | 35 | 35 | 35 | 35 | 55 | 35 |

TABLE 3-continued

|  |  | Conv. Ex. 1 | W.E. 1 | Comp. Ex. 1 | W.E. 2 | Comp. Ex. 2 | Comp. Ex. 3 | Comp. Ex. 4 |
|---|---|---|---|---|---|---|---|---|
| Groove area ratio $R_B$ |  | 36/46 | 55 | 55 | 41 | 40 | 35 | 55 |
| Groove area ratio $R_A$ |  | 46 | 55 | 55 | 50 | 55 | 55 | 35 |
| $\|R_A - R_B\|$ |  | — | 0 | 0 | 9 | 15 | 20 | 20 |
| Groove area ratio $R_C$ |  | 36 | 45 | 45 | 45 | 45 | 45 | 45 |
| Groove area ratio $R_D$ |  | 26 | 35 | 35 | 35 | 35 | 35 | 35 |
| Groove width of the drainage groove in the center region X | mm | 10 | 20 | 20 | 20 | 20 | 20 | 20 |
| Groove wall angle of the drainage groove in the center region X | ° | 50 | 50 | 50 | 50 | 50 | 50 | 50 |
| Sipe angle θ1 | ° | 30 | 30 | 30 | 30 | 30 | 30 | 30 |
| Sipe angle θ2 | ° | 30 | 30 | 30 | 30 | 30 | 30 | 30 |
| Sipe angle θ3 | ° | 30 | 30 | 30 | 30 | 30 | 30 | 30 |
| Uneven wear resistance | Index value | 100 | 102 | 98 | 102 | 98 | 98 | 98 |
| Hydroplaning prevention performance | Index value | 100 | 101 | 99 | 100 | 100 | 98 | 99 |
| Wet steering stability | Index value | 100 | 100 | 100 | 100 | 100 | 98 | 98 |
| Warming up performance | Index value | 100 | 102 | 98 | 102 | 100 | 98 | 99 |

In Table 3, "Conv. Ex." is an abbreviation for "Conventional Example"; "W.E." is an abbreviation for "Working Example"; and "Comp. Ex." is an abbreviation for "Comparative Example."

As can be seen in Tables 1 to 3, each of the tires according to Working Examples 1 to 16 had good uneven wear resistance, hydroplaning prevention performance, wet steering stability, and warming up performance compared with the Conventional Example 1. On the other hand, in Comparative Example 1 in which the size relationship of the spacings W1 to W3 was reversed, and Comparative Examples 2 to 4 in which the size relationship of the groove area ratio was outside the range of the present technology, the uneven wear performance, the hydroplaning prevention performance, the wet steering stability, and the warming up performance could not be achieved simultaneously.

The invention claimed is:

1. A pneumatic tire having a designated rotating direction, wherein:
   a plurality of drainage grooves positioned on each side of a tire equator line that extend at an angle in a direction opposite the rotating direction while curving outward in a tire width direction is provided in a tread portion;
   an end of a leading edge of the drainage grooves is closed and an end of a trailing edge of the drainage grooves is open to a tire side;
   an inclination angle to a tire circumferential direction at a terminal center position of the leading edge of the drainage grooves is from 0° to 45°, while an inclination angle to the tire circumferential direction at a terminal center position of the trailing edge of the drainage grooves is from 65° to 90°;
   land portions including a rib section continuously extending along the tire equator line and a plurality of branched sections continuously extending branched from the rib section outward in the tire width direction are formed in the tread portion;
   a plurality of sub grooves extending from the drainage grooves in the rotating direction is provided in each of the branched sections;
   an end of the leading edge of the sub grooves is closed;
   when obtaining a spacing in the tire width direction between the terminal center position of the leading edge of the drainage groove and the tire equator line, a spacing in the tire width direction between the terminal center position of the leading edge of the drainage groove and the terminal center position of the leading edge of the sub groove located closest to the tire equator line, a spacing in the tire width direction between the terminal center positions of the leading edges of adjacent sub grooves, and a spacing in the tire width direction between the terminal center position of the leading edge of the sub groove located outermost in the tire width direction and the terminal center position of the trailing edge of the drainage groove, the drainage groove and the sub grooves are arranged so that these spacings gradually increase outward in the tire width direction, also when a region A is a range 0% to 17% of a ground contact width W outward in the vehicle mounting direction from the tire equator line CL, a region B is a range 0% to 33% of the ground contact width W inward in the vehicle mounting direction from the tire equator line CL, a region C is a range 17% to 33% of the ground contact width W outward in the vehicle mounting direction from the tire equator line CL, a region D is a range 33% to 50% of the ground contact width W outward in the vehicle mounting direction from the tire equator line CL, and a region E is a range 33% to 50% of the ground contact width W inward in the vehicle mounting direction from the tire equator line CL, a groove area ratio $R_A$ in region A, a groove area ratio $R_B$ in region B, a groove area ratio $R_C$ in region C, a groove area ratio $R_D$ in region D, and a groove area ratio $R_E$ in region E satisfy the relationships $|R_B - R_A| \leq 9\%$, $R_A > R_C > R_D$, and $R_B > R_E$;

a groove depth of the drainage grooves in a center region X, located between a position at 20% of the ground contact width W inward in the tire mounting direction from the tire equator line CL and a position at 10% of the ground contact width W outward in the tire mounting direction from the tire equator line CL, is greater than a groove depth of the drainage grooves in a shoulder portion Y located at an edge of the ground contact width;

the pneumatic tire is a front use tire and a back use tire;

a plurality of sipes is provided in each branched portion, extending from the drainage groove in the rotating direction; and the inclination angle of each of the sipes to the tire circumferential direction becomes smaller from the tire equator line toward the edge of the ground contact width.

2. The pneumatic tire according to claim 1, wherein the groove area ratio $R_A$ and the groove area ratio $R_B$ are greater than 40% and not more than 50%, the groove area ratio $R_C$ is greater than 30% and not more than 40%, and the groove area ratio $R_D$ and the groove area ratio $R_E$ are not more than 30%.

3. The pneumatic tire according to claim 2, wherein:
two of the sub grooves are provided for every one of the drainage grooves;
the spacing W2 in the tire width direction between the terminal center position of the leading edge of the sub groove located closest to the tire equator line and the terminal center position of the leading edge of the sub groove located outermost in the tire width direction is from 1.2 to 1.6 times the spacing W1 in the tire width direction between the terminal center position of the leading edge of the drainage groove and the terminal center position of the leading edge of the sub groove located closest to the tire equator line; and
the spacing W3 in the tire width direction between the terminal center position of the leading edge of the sub groove located outermost in the tire width direction and the terminal center position of the trailing edge of the drainage groove is from 2.0 to 2.4 times the spacing W1.

4. The pneumatic tire according to claim 3, wherein:
the groove depth of the drainage grooves in the center region X is from 120% to 190% of the groove depth of the drainage grooves in the shoulder portion Y;
a groove width of the drainage grooves in the center region X is from 3 mm to 15 mm; and
a groove wall angle of the drainage grooves in the center region X is from 0° to 45°.

5. The pneumatic tire according to claim 4, wherein: a plurality of sipes is provided in each branched portion, extending from the drainage groove in the rotating direction; and
the inclination angle of each of the sipes to the tire circumferential direction becomes smaller from the tire equator line toward the edge of the ground contact width.

6. The pneumatic tire according to claim 3, wherein:
a plurality of sipes is provided in each branched portion, extending from the drainage groove in the rotating direction; and
the inclination angle of each of the sipes to the tire circumferential direction becomes smaller from the tire equator line toward the edge of the ground contact width.

7. The pneumatic tire according to claim 2, wherein:
the groove depth of the drainage grooves in the center region X is from 120% to 190% of the groove depth of the drainage grooves in the shoulder portion Y;
a groove width of the drainage grooves in the center region X is from 3 mm to 15 mm; and
a groove wall angle of the drainage grooves in the center region X is from 0° to 45°.

8. The pneumatic tire according to claim 7, wherein: a plurality of sipes is provided in each branched portion, extending from the drainage groove in the rotating direction; and
the inclination angle of each of the sipes to the tire circumferential direction becomes smaller from the tire equator line toward the edge of the ground contact width.

9. The pneumatic tire according to claim 1, wherein:
two of the sub grooves are provided for every one of the drainage grooves;
the spacing W2 in the tire width direction between the terminal center position of the leading edge of the sub groove located closest to the tire equator line and the terminal center position of the leading edge of the sub groove located outermost in the tire width direction is from 1.2 to 1.6 times the spacing W1 in the tire width direction between the terminal center position of the leading edge of the drainage groove and the terminal center position of the leading edge of the sub groove located closest to the tire equator line; and
the spacing W3 in the tire width direction between the terminal center position of the leading edge of the sub groove located outermost in the tire width direction and the terminal center position of the trailing edge of the drainage groove is from 2.0 to 2.4 times the spacing W1.

10. The pneumatic tire according to claim 9, wherein:
the groove depth of the drainage grooves in the center region X is from 120% to 190% of the groove depth of the drainage grooves in the shoulder portion Y;
a groove width of the drainage grooves in the center region X is from 3 mm to 15 mm; and
a groove wall angle of the drainage grooves in the center region X is from 0° to 45°.

11. The pneumatic tire according to claim 10, wherein:
a plurality of sipes is provided in each branched portion, extending from the drainage groove in the rotating direction; and
the inclination angle of each of the sipes to the tire circumferential direction becomes smaller from the tire equator line toward the edge of the ground contact width.

12. The pneumatic tire according to claim 9, wherein:
a plurality of sipes is provided in each branched portion, extending from the drainage groove in the rotating direction; and
the inclination angle of each of the sipes to the tire circumferential direction becomes smaller from the tire equator line toward the edge of the ground contact width.

13. The pneumatic tire according to claim 1, wherein:
the groove depth of the drainage grooves in the center region X is from 120% to 190% of the groove depth of the drainage grooves in the shoulder portion Y;
a groove width of the drainage grooves in the center region X is from 3 mm to 15 mm; and
a groove wall angle of the drainage grooves in the center region X is from 0° to 45°.

14. The pneumatic tire according to claim 1, wherein a plurality of sipes is provided in each branched portion, extending from the drainage groove in the rotating direction, and a depth of the sipes is from 25% to 75% of a depth of the drainage grooves.

15. The pneumatic tire according to claim 1, wherein the drainage grooves have a groove width from 3.0 mm to 20 mm and a groove depth from 2.5 mm to 8.0 mm.

16. The pneumatic tire according to claim 1, wherein the sub grooves have a groove width from 3.0 mm to 12 mm and a groove depth from 2.5 mm to 8.0 mm.

17. The pneumatic tire according to claim 1, wherein inclination angles of the drainage grooves to the tire circumferential direction increase toward the sub grooves located further outward in the tire width direction.

18. A pneumatic tire having a designated rotating direction, wherein:
- a plurality of drainage grooves positioned on each side of a tire equator line that extend at an angle in a direction opposite the rotating direction while curving outward in a tire width direction is provided in a tread portion;
- an end of a leading edge of the drainage grooves is closed and an end of a trailing edge of the drainage grooves is open to a tire side;
- an inclination angle to a tire circumferential direction at a terminal center position of the leading edge of the drainage grooves is from 0° to 45°, while an inclination angle to the tire circumferential direction at a terminal center position of the trailing edge of the drainage grooves is from 65° to 90°;
- land portions including a rib section continuously extending along the tire equator line and a plurality of branched sections continuously extending branched from the rib section outward in the tire width direction are formed in the tread portion;
- a plurality of sub grooves extending from the drainage grooves in the rotating direction is provided in each of the branched sections;
- an end of the leading edge of the sub grooves is closed;
- when obtaining a spacing in the tire width direction between the terminal center position of the leading edge of the drainage groove and the tire equator line, a spacing in the tire width direction between the terminal center position of the leading edge of the drainage groove and the terminal center position of the leading edge of the sub groove located closest to the tire equator line, a spacing in the tire width direction between the terminal center positions of the leading edges of adjacent sub grooves, and a spacing in the tire width direction between the terminal center position of the leading edge of the sub groove located outermost in the tire width direction and the terminal center position of the trailing edge of the drainage groove, the drainage groove and the sub grooves are arranged so that these spacings gradually increase outward in the tire width direction, also when a region A is a range 0% to 17% of a ground contact width W outward in the vehicle mounting direction from the tire equator line CL, a region B is a range 0% to 33% of the ground contact width W inward in the vehicle mounting direction from the tire equator line CL, a region C is a range 17% to 33% of the ground contact width W outward in the vehicle mounting direction from the tire equator line CL, a region D is a range 33% to 50% of the ground contact width W outward in the vehicle mounting direction from the tire equator line CL, and a region E is a range 33% to 50% of the ground contact width W inward in the vehicle mounting direction from the tire equator line CL, a groove area ratio $R_A$ in region A a groove area ratio $R_B$ in region B, a groove area ratio $R_C$ in region C, a groove area ratio $R_D$ in region D, and a groove area ratio $R_E$ in region E satisfy the relationships $|R_B - R_A| \leq 9\%$, $R_A > R_C > R_D$, and $R_B > R_E$;
- a groove depth of the drainage grooves in a center region X, located between a position at 20% of the ground contact width W inward in the tire mounting direction from the tire equator line CL and a position at 10% of the ground contact width W outward in the tire mounting direction from the tire equator line CL, is greater than a groove depth of the drainage grooves in a shoulder portion Y located at an edge of the ground contact width;
- the pneumatic tire is a front use tire and a back use tire;
- the groove area ratio $R_A$ and the groove area ratio $R_B$ are greater than 40% and not more than 50%, the groove area ratio $R_C$ is greater than 30% and not more than 40%, and the groove area ratio $R_D$ and the groove area ratio $R_E$ are not more than 30%;
- a plurality of sipes is provided in each branched portion, extending from the drainage groove in the rotating direction; and
- the inclination angle of each of the sipes to the tire circumferential direction becomes smaller from the tire equator line toward the edge of the ground contact width.

19. A pneumatic tire having a designated rotating direction, wherein:
- a plurality of drainage grooves positioned on each side of a tire equator line that extend at an angle in a direction opposite the rotating direction while curving outward in a tire width direction is provided in a tread portion;
- an end of a leading edge of the drainage grooves is closed and an end of a trailing edge of the drainage grooves is open to a tire side;
- an inclination angle to a tire circumferential direction at a terminal center position of the leading edge of the drainage grooves is from 0° to 45°, while an inclination angle to the tire circumferential direction at a terminal center position of the trailing edge of the drainage grooves is from 65° to 90°;
- land portions including a rib section continuously extending along the tire equator line and a plurality of branched sections continuously extending branched from the rib section outward in the tire width direction are formed in the tread portion;
- a plurality of sub grooves extending from the drainage grooves in the rotating direction is provided in each of the branched sections;
- an end of the leading edge of the sub grooves is closed;
- when obtaining a spacing in the tire width direction between the terminal center position of the leading edge of the drainage groove and the tire equator line, a spacing in the tire width direction between the terminal center position of the leading edge of the drainage groove and the terminal center position of the leading edge of the sub groove located closest to the tire equator line, a spacing in the tire width direction between the terminal center positions of the leading edges of adjacent sub grooves, and a spacing in the tire width direction between the terminal center position of the leading edge of the sub groove located outermost in the tire width direction and the terminal center position of the trailing edge of the drainage groove, the drainage groove and the sub grooves are arranged so that these spacings gradually increase outward in the tire width direction, also when a region A is a range 0% to 17% of a ground contact width W outward in the vehicle mounting direction from the tire equator line CL, a region B is a range 0% to 33% of the ground contact width W inward in the vehicle mounting direction from the tire equator line CL, a region C is a range 17% to 33% of the ground contact width W outward in the vehicle mounting direction from the tire equator line CL, a region D is a range 33% to 50% of the ground contact width W outward in the vehicle mounting direction from the tire equator line CL, and a region E is a range 33% to 50% of the ground contact width W inward in the vehicle mounting direction from the tire equator line CL, groove area ratio $R_A$ in region A groove area ratio $R_B$ in region B, a groove area ratio $R_C$ in region C, a groove area ratio $R_D$ in region D, and a groove area ratio $R_E$ in region E satisfy the relationships $|R_B-R_A|\leq 9\%$, $R_A>R_C>R_D$, and $R_B>R_E$; and a groove depth of the drainage grooves in a center region X, located between a position at 20% of the ground contact width W inward in the tire mounting direction from the tire equator line CL and a position at 10% of the ground contact width W outward in the tire mounting direction from the tire equator line CL, is greater than a groove depth of the drainage grooves in a shoulder portion Y located at an edge of the ground contact width;

the pneumatic tire is a front use tire and a back use tire;

the groove depth of the drainage grooves in the center region X is from 120% to 190% of the groove depth of the drainage grooves in the shoulder portion Y;

a groove width of the drainage grooves in the center region X is from 3 mm to 15 mm; and a groove wall angle of the drainage grooves in the center region X is from 0° to 45°;

a plurality of sipes is provided in each branched portion, extending from the drainage groove in the rotating direction; and the inclination angle of each of the sipes to the tire circumferential direction becomes smaller from the tire equator line toward the edge of the ground contact width.

20. The pneumatic tire according to claim 19, wherein:

a plurality of sipes is provided in each branched portion, extending from the drainage groove in the rotating direction; and the inclination angle of each of the sipes to the tire circumferential direction becomes smaller from the tire equator line toward the edge of the ground contact width.

* * * * *